US012646895B2

(12) United States Patent
Hu et al.

(10) Patent No.: US 12,646,895 B2
(45) Date of Patent: Jun. 2, 2026

(54) PLUG CONNECTOR

(71) Applicant: ITT CANNON ELECTRONICS (SHENZHEN) CO., LTD., Shenzhen (CN)

(72) Inventors: Yahui Hu, Shenzhen (CN); Shiyong Wang, Shenzhen (CN)

(73) Assignee: ITT CANNON ELECTRONICS (SHENZHEN) CO., LTD., Shenzhen (CN)

( * ) Notice: Subject to any disclaimer, the term of this patent is extended or adjusted under 35 U.S.C. 154(b) by 351 days.

(21) Appl. No.: 18/404,876

(22) Filed: Jan. 4, 2024

(65) Prior Publication Data

US 2025/0105562 A1 Mar. 27, 2025

(30) Foreign Application Priority Data

Sep. 22, 2023 (CN) ......................... 202322582212.2
Oct. 9, 2023 (CN) ......................... 202322712311.8

(51) Int. Cl.
*H01R 13/66* (2006.01)
*H01R 13/52* (2006.01)
*H01R 13/74* (2006.01)

(52) U.S. Cl.
CPC ..... *H01R 13/6675* (2013.01); *H01R 13/5202* (2013.01); *H01R 13/6691* (2013.01); *H01R 13/74* (2013.01)

(58) Field of Classification Search
CPC ............ H01R 13/6675; H01R 13/5202; H01R 13/6691; H01R 13/74
See application file for complete search history.

(56) References Cited

U.S. PATENT DOCUMENTS 7,575,473 B2 * 8/2009 Kodama .............. H01R 13/743 439/549
8,992,249 B2 * 3/2015 Kobayashi ......... H01R 13/6581 439/564
2013/0217262 A1 * 8/2013 Ikeda .................. H01R 13/521 439/544
2014/0302711 A1 * 10/2014 Suzuki ............... H01R 13/5202 439/556
2015/0044903 A1 * 2/2015 Gruber ..................... H05K 5/03 439/540.1
2016/0006159 A1 * 1/2016 Kawamura .......... H01R 13/514 439/540.1

* cited by examiner

*Primary Examiner* — Tulsidas C Patel
(74) *Attorney, Agent, or Firm* — Yue (Robert) Xu; Apex Attorneys at Law, LLP

(57) ABSTRACT

The present disclosure provides a plug connector, including: a mounting plate including a first side having an electrical component area; a first electrical component cavity and a second electrical component cavity arranged in the electrical component area; a first electrical component arranged in the first electrical component cavity and a second electrical component arranged in the second electrical component cavity. The plug connector further includes a groove, a sealing ring arranged in the groove and a fixing plate arranged on the first side, wherein the sealing ring is arranged between the fixing plate and the mounting plate. The plug connector can provides a waterproof function during a floating insertion of a mating connector.

15 Claims, 11 Drawing Sheets

PLUG CONNECTOR

CROSS-REFERENCE TO RELATED APPLICATIONS

The present application claims the benefit of priority to Chinese patent application No. 202322712311.8, filed on Oct. 9, 2023, entitled "PLUG CONNECTOR", and claims the benefit of priority to Chinese patent application No. 202322582212.2, filed on Sep. 22, 2023, entitled "PLUG CONNECTOR", the entire disclosures of all of which are incorporated herein by reference.

TECHNICAL FIELD

The present disclosure relates to the technical field of connectors, and more particularly to a plug connector.

BACKGROUND

Connectors are components which set up a communication bridge between blocked or isolated circuits, thereby allowing current to flow and enabling the circuits to achieve predetermined functions. Connectors are essential components in electronic devices, and forms and structures of the connectors are ever changing depending on different application objects, frequencies, powers, application environments, etc.

An energy storage connector is a common type of electrical connector, which includes a board end socket fixed on a device shell and a wire end plug inserted into the board end socket. After the wire end plug is inserted into the board end socket, an electrical connection can be achieved. For example, in the field of electric vehicles, the energy storage connector is often used to charge the vehicles.

However, the performance of existing energy storage connectors still needs to be improved.

SUMMARY

An embodiment of the present disclosure provides a plug connector, in order to provide a waterproof function during a floating insertion of a mating connector.

According to some embodiments, the plug connector includes: a mounting plate including a first side, wherein the first side includes an electrical component area; a first electrical component cavity and a second electrical component cavity arranged in the electrical component area and extending through the mounting plate from the first side; and a first electrical component arranged in the first electrical component cavity and a second electrical component arranged in the second electrical component cavity; wherein the plug connector further includes: a groove concave from the first side into the mounting plate perpendicular to the first side, wherein the groove surrounds an outer side of the electrical component area; a sealing ring arranged in the groove, wherein a top surface of the sealing ring protrudes from the first side; and a fixing plate arranged on the first side, wherein the fixing plate has an opening for exposing the electrical component area, and the sealing ring is arranged between the fixing plate and the mounting plate.

According to some embodiments, the first electrical component is removably connected with the first electrical component cavity, and/or the second electrical component is removably connected with the second electrical component cavity.

According to some embodiments, the first electrical component cavity is provided with at least one step portion protruding from an inner wall of the first electrical component cavity.

According to some embodiments, a side wall of the first electrical component is provided with a claw structure for matching with the step portion, when the first electrical component is inserted into the first electrical component cavity from the first side, the claw structure deforms under a squeezing force of the step portion, and after the first electrical component is inserted into the first electrical component cavity, the claw structure restores to contact and lock the step portion.

According to some embodiments, an inclined angle between the claw structure and the side wall of the first electrical component ranges from 6 degrees to 12 degrees, and the claw structure has an elastic modulus ranging from 0.3 to 0.5.

According to some embodiments, the first electrical component is configured to transmit a communication signal or a control signal, and the second electrical component is configured to transmit a power signal.

According to some embodiments, the second electrical component cavity is provided with a pair of positioning posts symmetrically arranged on an outer wall of the second electrical component cavity.

According to some embodiments, the second electrical component cavity is further provided with a plurality of first guide posts and a plurality of second guide posts arranged on the outer wall of the second electrical component cavity, and the plurality of first guide posts and the plurality of second guide posts are respectively arranged on the outer wall of the second electrical component cavity between the pair of positioning posts.

According to some embodiments, a plurality of inverted buckles are arranged on the outer wall of the second electrical component cavity, wherein at least one inverted buckle is arranged between adjacent first guide posts, and at least one inverted buckle is arranged between adjacent second guide posts.

According to some embodiments, the second electrical component includes a wire and a back cover sleeved on a portion of an outer wall of the wire, and a side wall of the back cover has an inverted buckle step corresponding to the inverted buckle.

According to some embodiments, the side wall of the back cover also has a plurality of first guide post slots corresponding to the plurality of first guide posts respectively and a plurality of second guide post slots corresponding to the plurality of second guide posts respectively, when the second electrical component is inserted into the second electrical component cavity from the first side, the inverted buckle deforms under a squeezing force of the inverted buckle step, and after the second electrical component is inserted into the second electrical component cavity, the inverted buckle restores to contact and lock the inverted buckle step, the plurality of first guide posts are inserted into the plurality of first guide post slots respectively, and the plurality of second guide posts are inserted into the plurality of second guide post slots respectively.

According to some embodiments, a first gap is formed between each of the plurality of first guide posts and each of the plurality of first guide post slots, a second gap is formed between each of the plurality of second guide posts and each of the plurality of second guide post slots, and a size of the first gap is different from a size of the second gap.

According to some embodiments, the groove further includes a plurality of positioning holes evenly arranged at a bottom of the groove, the sealing ring further includes a plurality of fixing posts corresponding to the plurality of positioning holes, and when the sealing ring is positioned in the groove, the plurality of fixing posts are inserted in the plurality of positioning holes respectively.

According to some embodiments, the sealing ring has a Shore hardness ranging from 30 HA to 50 HA and an elastic coefficient ranging from 0.01 N/m to 0.5 N/m; and/or wherein the sealing ring is made of a mixture of a silicone and a phenyl silicone oil, and a mass ratio of the phenyl silicone oil to the silicone ranges from 0.01:1 to 0.03:1.

According to some embodiments, the top surface of the sealing ring protrudes from the first side by 0.5 mm to 2 mm; and/or wherein a ratio of a volume of a part of the sealing ring protruding from the first side to a volume of the sealing ring ranges from 0.2:1 to 0.3:1.

The embodiments of the present disclosure have following beneficial effects.

In the plug connector according to the present disclosure, the mounting plate is provided with a groove surrounding an outer side of the electrical component area, and the sealing ring is arranged in the groove. When mounting the fixing plate on the first side, the sealing ring can achieve a sealed connection between the fixing plate and the mounting plate, achieving a good waterproof and anti-fouling function. In addition, the fixing plate is provided with an opening for exposing the electrical component area. When a size of the opening is not very precise and the fixing plate cannot well cover the mounting plate, since the top surface of the sealing ring protrudes from the surface of the groove, the flexibility and elasticity of the sealing ring can make up for the deficiencies caused by the size of the opening, which can achieve effective mounting of the fixing plate to the mounting plate, improve the quality of the plug connector and improve production efficiency.

Furthermore, the first electrical component is removably connected with the first electrical component cavity, or the second electrical component is removably connected with the second electrical component cavity, or the first electrical component is removably connected with the first electrical component cavity while the second electrical component is removably connected with the second electrical component cavity, which can achieve an independent assembly of the first electrical component, or an independent assembly of the second electrical component, or a simultaneous independent assembly of the first electrical component and the second electrical component, achieve an automated production of the first electrical component or the second electrical component, simplify the production process of the plug connector, facilitate disassembly when repairing or replacing the first electrical component or the second electrical component, and achieve a wide range of applications.

Furthermore, a plurality of first guide posts and a plurality of second guide posts are arranged on the outer wall of the second electrical component cavity. When the second electrical component is inserted into the second electrical component cavity, a first gap is formed between a first guide post and a first guide post slot, a second gap is formed between a second guide post and a second guide post slot, and a size of the first gap is different from a size of the second gap, which can prevent incorrect placement of positive or negative electrodes of the second electrical component and avoid error and mistake.

Furthermore, the groove further comprises a plurality of positioning holes evenly arranged at a bottom of the groove, and the sealing ring further includes a plurality of fixing posts corresponding to the plurality of positioning holes. When the sealing ring is positioned in the groove, each of the plurality of fixing posts is inserted in one corresponding positioning hole. Thus, when the sealing ring floats or shifts, and the plurality of fixing posts trend to detach from the plurality of positioning holes, a reaction force will be generated between the plurality of fixing posts and the plurality of positioning holes to prevent the plurality of fixing posts from detaching from the plurality of positioning holes respectively, which can ensure that the sealing ring is always positioned in the groove and ensure the sealing between the fixing plate and the mounting plate.

DETAILED DESCRIPTION

Figure 1:
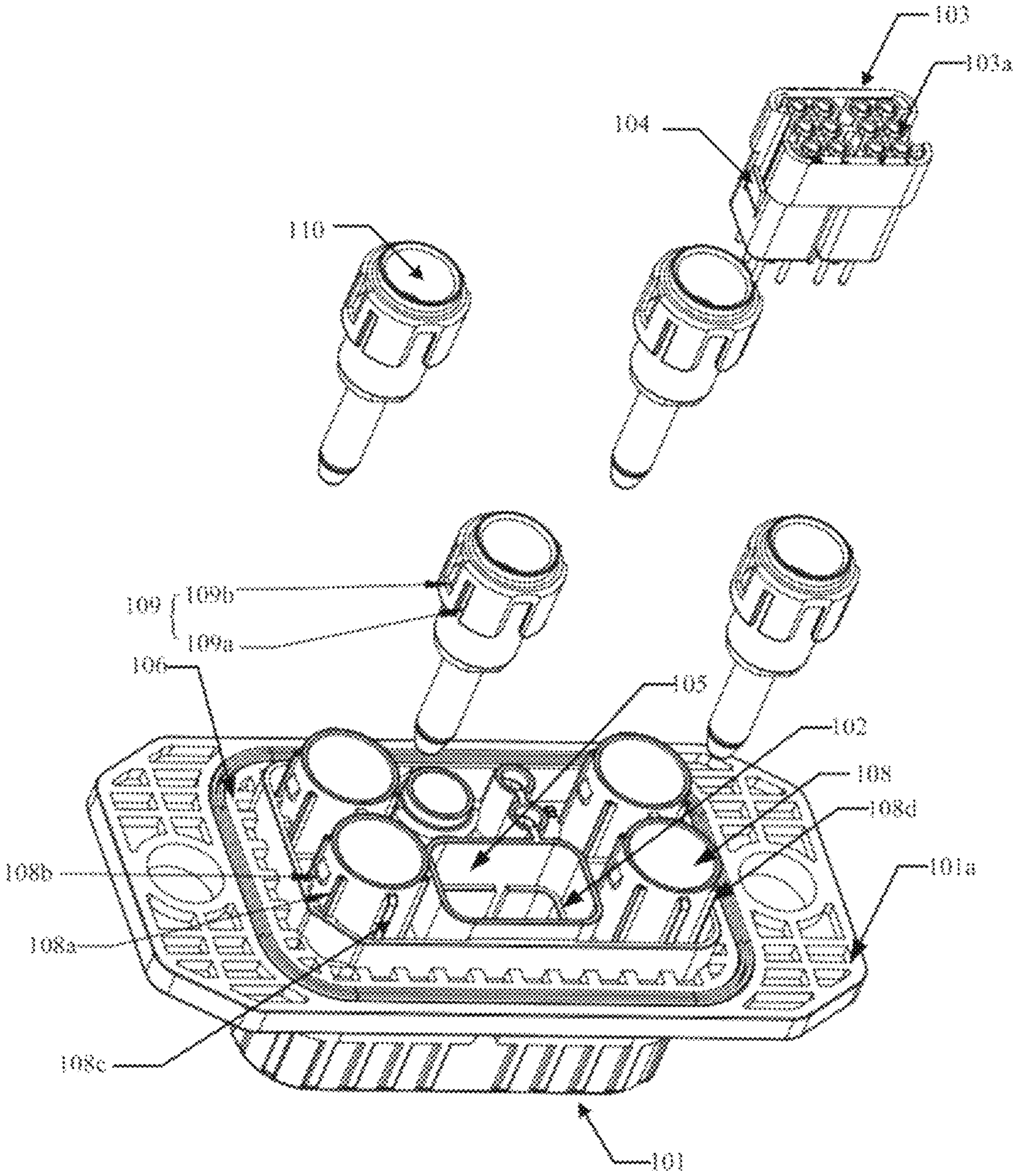
FIG. 1 is an exploded schematic view of a plug connector according to an embodiment of the present disclosure.

The embodiments of the present disclosure are described in detail below, and examples of the embodiments are shown in the accompanying drawings. In the attached drawings, the same or similar signs represent the same or similar components or components with the same or similar functions. The embodiments described below with reference to the accompanying drawings are exemplary and are only intended to explain the present disclosure and cannot be understood as limiting the present disclosure.

The implementation and application of specific embodiments will be discussed in detail below. However, it should be understood that the specific embodiments discussed only exemplarily illustrate specific ways of implementing and applying the present disclosure, and are not limiting the scope of the present disclosure. In the following description, some directional representations, such as "left", "right", "top", "bottom", "front", "back", are used with reference to the directions shown in the drawings. When the components are arranged as shown in the figure, these directional representations are appropriate, but when the positions of the components in the figures change, these directional representations also change accordingly.

Figure 2:
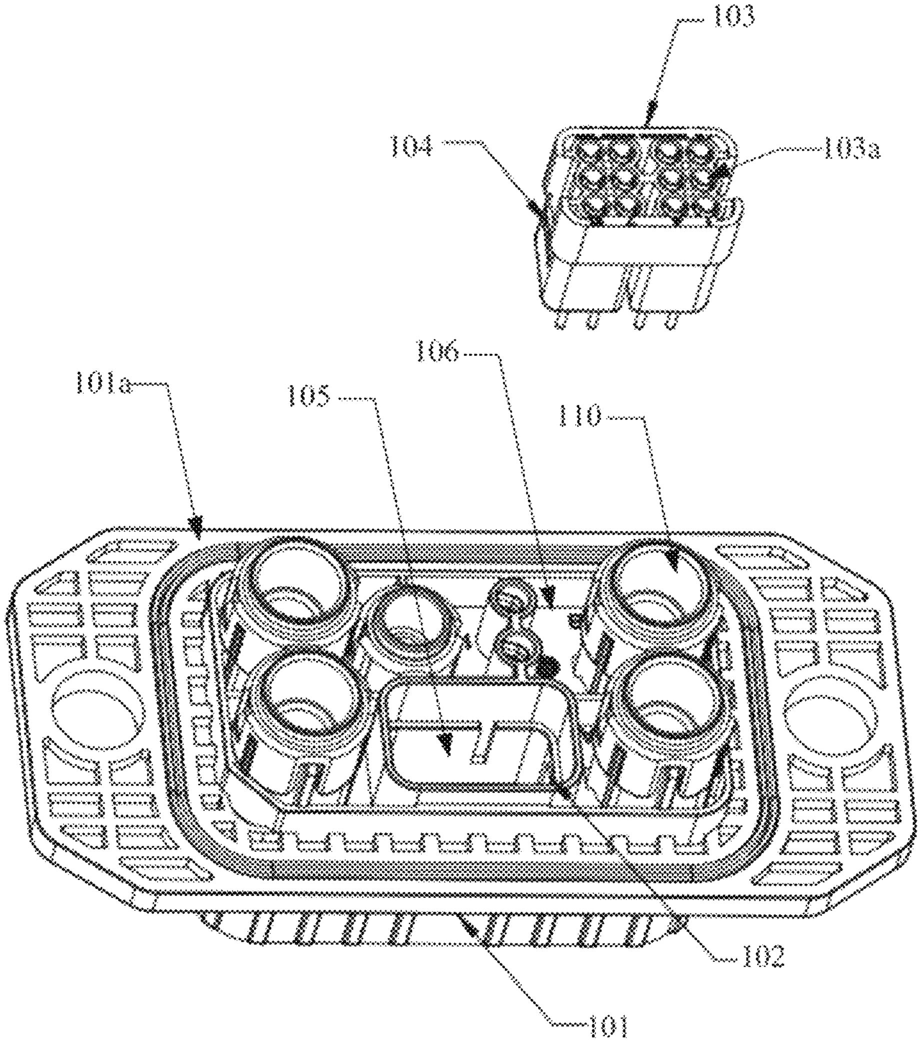
FIG. 2 is a partial exploded schematic view of a plug connector according to an embodiment of the present disclosure.
Figure 3:
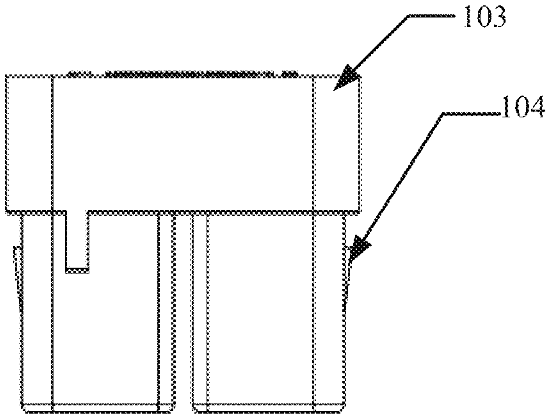
FIG. 3 is a front schematic view of a first electrical component according to an embodiment of the present disclosure.

Referring to FIGS. 1 and 2, a plug connector 100 includes a mounting plate 101.

The mounting plate 101 includes a first side 101*a*, and the first side 101*a* includes an electrical component area 106.

A first electrical component cavity 105 and a second electrical component cavity 108 are arranged in the electrical component area 106 and extend through the mounting plate 101 from the first side 101*a.*

A first electrical component 103 is arranged in the first electrical component cavity 105, and the first electrical component 103 is removably connected with the first electrical component cavity 105.

A second electrical component 110 is arranged in the second electrical component cavity 108, and the second electrical component 110 is removably connected with the second electrical component cavity 108.

In some embodiments, the first electrical component 103 includes a plurality of first electrical component units 103*a* for transmitting communication signals or control signals.

In some embodiments, the functions of the first electrical component 103 can be selected according to actual needs.

In some embodiments, the electrical component area 106 has a plurality of the second electrical component cavities 108, and each second electrical component cavity 108 is inserted with a second electrical component 110 for transmitting power signals.

In some embodiments, the second electrical component 110 can also be used for the transmission or control of communication signals, and can be designed according to actual needs.

In some embodiments, there are four second electrical component cavities 108 symmetrically arranged in pairs on the electrical component area 106.

In some embodiments, a pattern of the electrical component area 106 projected onto the first side 101*a* has a quasi-rectangular shape, and the plurality of second electrical component cavities 108 are arranged at four top corners of the quasi-rectangular shape.

In some embodiments, the pattern of the electrical component area 106 projected onto the first side 101*a* can also have other shapes, which can be set according to actual needs.

In some embodiments, the first electrical component cavity 105 is arranged between adjacent second electrical component cavities 108.

In some embodiments, the position of the first electrical component cavity 105 can also be set according to actual electrical needs.

In some embodiments, the first electrical component 103 and the second electrical component 110 may have different functions. By combining the first electrical component 103 and the second electrical component 110 on the plug connector 100, a hybrid energy storage conductive transmission connection can be achieved, which is convenient for coordination and connection between a plurality of connectors.

In some embodiments, the first electrical component 103 is removably connected with the first electrical component cavity 105 while the second electrical component 110 is removably connected with the second electrical component cavity 108, which can achieve an independent assembly of the first electrical component 103 and the second electrical component 110, achieve an automated production of the first electrical component 103 and the second electrical component 110, simplify the production process of the plug connector 100, facilitate the disassembly of the first electrical component 103 or the second electrical component 110 when repairing or replacing the first electrical component 103 or the second electrical component 110, and achieve a wide range of applications.

In some embodiments, the first electrical component 103 may be removably connected with the first electrical component cavity 105, and the second electrical component 110 may be fixedly connected with the second electrical component cavity 108.

In some embodiments, the second electrical component 110 may be removably connected with the second electrical component cavity 108, and the first electrical component 103 may be fixedly connected with the first electrical component cavity 105.

In some embodiments, referring to FIG. 1, a pair of positioning posts 108*c* is arranged on an outer wall of the second electrical component cavity 108, and a projection pattern of the pair of positioning posts 108*c* on the first side 101*a* is located on a same diameter of the second electrical component cavity 108.

Still referring to FIG. 1, a plurality of first guide posts 108*a* and a plurality of second guide posts 108*d* are arranged on the outer wall of the second electrical component cavity 108 between the pair of positioning posts 108*c.*

In some embodiments, the outer wall of the second electrical component cavity 108 is divided into two areas by the pair of positioning posts 108*c*. The plurality of first guide posts 108*a* are arranged in the same area of the outer wall of the second electrical component cavity 108, and the plurality of second guide posts 108*d* are arranged in the same area of the outer wall of the second electrical component cavity 108. The plurality of first guide posts 108*a* and the plurality of second guide posts 108*d* are not alternately arranged, that is to say, there is no second guide post 108*d* between adjacent first guide posts 108*a*, and there is no first guide post 108*a* between adjacent second guide posts 108*d.*

In some embodiments, the first guide posts 108*a* and the second guide posts 108*d* are made of plastic.

In some embodiments, the outer wall of the second electrical component cavity 108 may also have a plurality of inverted buckles 108*b*. At least one inverted buckle 108*b* is arranged between adjacent first guide posts 108*a*, and at least one inverted buckle 108*b* is arranged between adjacent second guide posts 108*d.*

Figure 9:
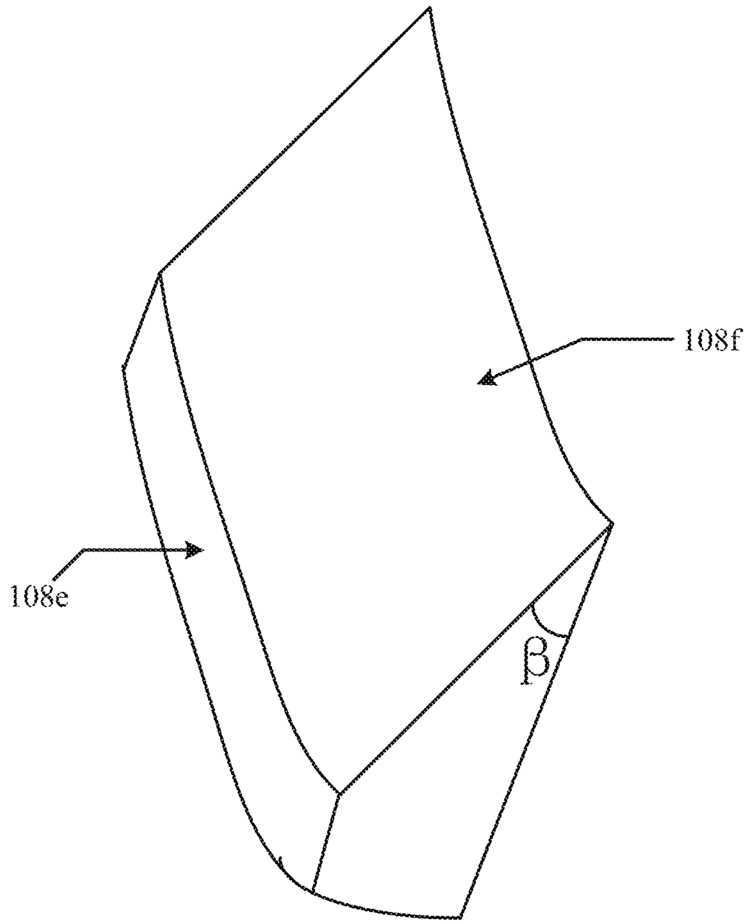
FIG. 9 is a structural schematic view of an inverted buckle according to an embodiment of the present disclosure.

In some embodiments, referring to FIG. 9, each inverted buckle 108*b* includes a guide surface 108*e* parallel to the outer wall of the second electrical component cavity 108 and a reverse surface 108*f* between the guide surface 108*e* and the outer wall of the second electrical component cavity 108. An angle β is formed between the reverse surface 108*f* and the outer wall of the second electrical component cavity 108.

Figure 8:
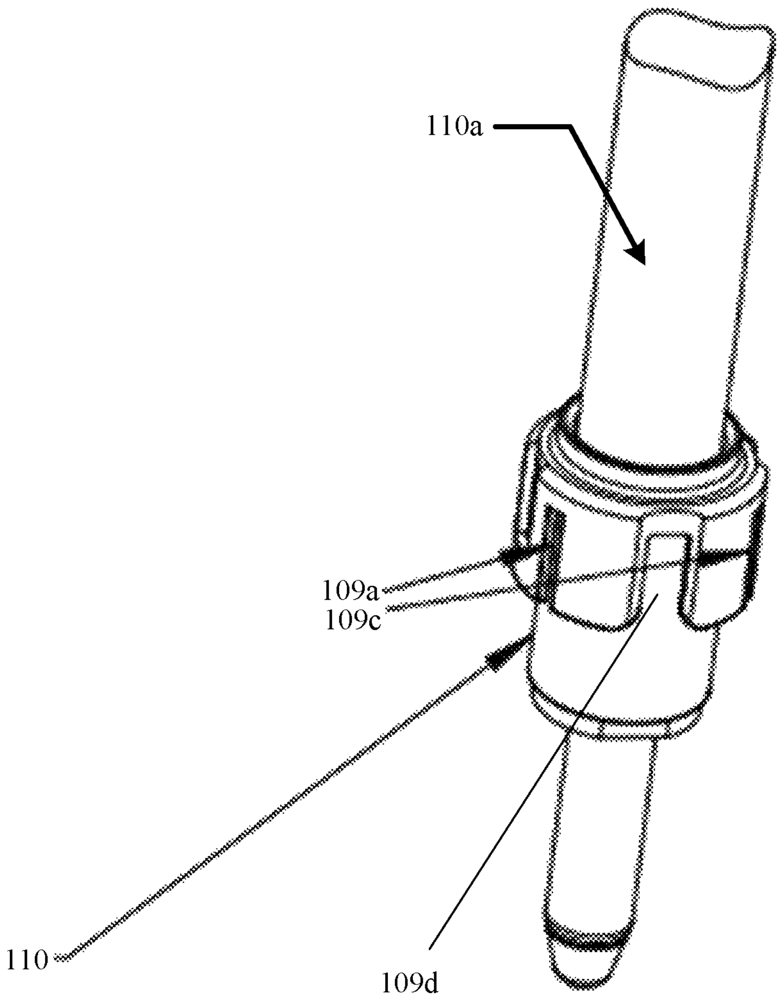
FIG. 8 is a structural schematic view of a second electrical component according to an embodiment of the present disclosure.

In some embodiments, still referring to FIGS. 1 and 8, the second electrical component 110 includes a wire 110*a* and a back cover 109 sleeved on a portion of an outer wall of the wire 110*a*. A side wall of the back cover 109 has an inverted buckle step 109*b* corresponding to the inverted buckle 108*b.*

In some embodiments, the angle β is an acute angle, which can reduce a clamping resistance between the inverted buckle 108*b* and the inverted buckle step 109*b*, and achieve an effective connection between the second electrical component 110 and the second electrical component cavity 108.

In some embodiments, a gap exists between the side wall of the back cover 109 and the side wall of the wire 110*a*, which reserves a space for subsequent connection between the back cover 109 and the outer wall of the second electrical component cavity 108.

In some embodiments, the back cover 109 is made of plastic.

In some embodiments, referring to FIGS. 1 and 8, the side wall of the back cover 109 also has a plurality of first guide post slot 109*a* corresponding to the plurality of first guide posts 108*a* respectively and a plurality of second guide post slots 109*c* corresponding to the second guide posts 108*d* respectively. When the second electrical component 110 is inserted into the second electrical component cavity 108 from the first side 101*a*, the inverted buckle 108*b* deforms under a squeezing force of the inverted buckle step 109*b*. After the second electrical component 110 is inserted into the second electrical component cavity 108, the inverted buckle 108*b* restores to contact and lock the inverted buckle step 109*b*. Each first guide post 108*a* is inserted into one corresponding first guide post slot 109*a*, and each second guide post 108*d* is inserted into one corresponding second guide post slot 109*c*.

In some embodiments, a first gap exists between the first guide post 108*a* and the first guide post groove 109*a*, and a second gap exists between the second guide post 108*d* and the second guide post groove 109*c*. A size of the first gap is different from a size of the second gap. When the second electrical component 110 is inserted incorrectly, due to the presence of the first gap or the second gap, the first guide post 108*a* cannot be inserted into the second guide post slot 109*c*, and the second guide post 108*d* cannot be inserted into the first guide post slot 109*a*, which can prevent incorrect placement of positive or negative electrodes of the second electrical component 110 and avoid error and mistake.

In some embodiments, after the first guide post 108*a* and the second guide post 108*d* are respectively inserted into the first guide post slot 109*a* and the second guide post slot 109*c*, the positioning posts 108*c* are simultaneously inserted into corresponding positioning post slots 109*d*.

Figure 5:
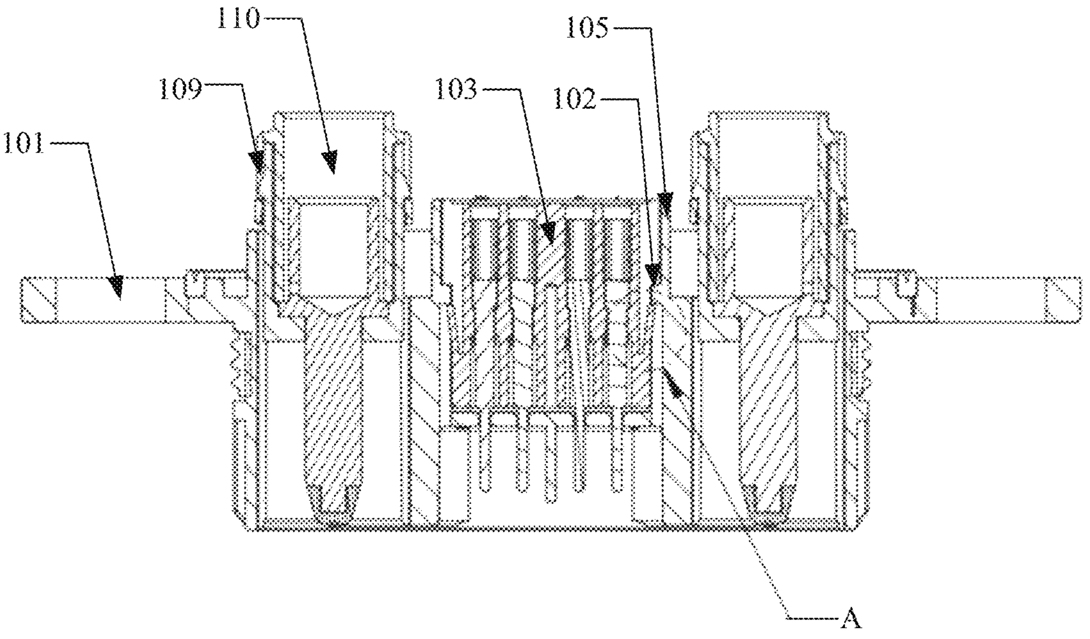
FIG. 5 is a cross-sectional schematic view of a plug connector according to an embodiment of the present disclosure.

In some embodiments, referring to FIGS. 1 and 5, a step portion 102 protrudes from the inner wall of the first electrical component cavity 105.

In some embodiments, at least two step portions 102 are arranged opposite to each other on the inner wall of the first electrical component cavity 105.

In some embodiments, the number of the step portions 102 may also be three, four, etc. In some embodiments, other different numbers can be selected according to actual needs.

In some embodiments, each step portion 102 includes two step surfaces parallel to each other and a contact surface connecting two step surfaces. The contact surface is parallel to the inner wall of the first electrical component cavity 105, and the two step surfaces are perpendicular to the contact surface.

In some embodiments, the step surfaces and the contact surface may also be not perpendicular to each other.

Figure 6:
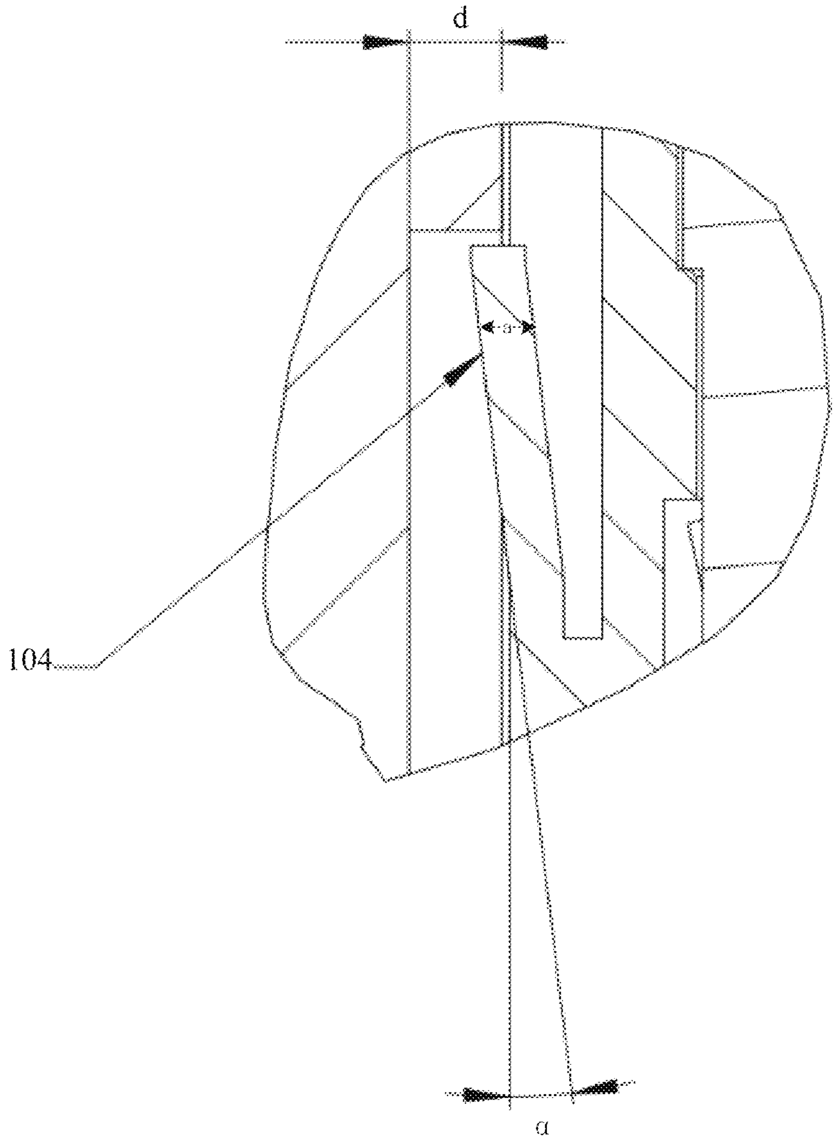
FIG. 6 is an enlarged view of portion A in FIG. 5.

In some embodiments, referring to FIG. 6, in a direction perpendicular to an interior of the first electrical component cavity 105, a width d of the step portion 102 protruding from the inner wall of the first electrical component cavity 105 ranges from 1.2 mm to 2.0 mm.

In some embodiments, the step portion 102 may be integrally formed with the first electrical component cavity 105.

In some embodiments, the step portion 102 may be not integrally formed with the first electrical component cavity 105.

In some embodiments, when the width d of the step portion 102 protruding from the inner wall of the first electrical component cavity 105 is less than 1.2 mm, a contact area between subsequent claw structure and the step portion 102 is too small, thus the first electrical component 103 cannot be tightly clamped in the first electrical component cavity 105, and the first electrical component 103 may detach from the first electrical component cavity 105, and there is no space for disassembly tools, which is not convenient for disassembly. When the width d of the step portion 102 protruding from the inner wall of the first electrical component cavity 105 is greater than 2.0 mm, the overall size of the connector may increase, which affects a layout space of the overall connector.

Referring to FIGS. 3 to 6, a side wall of the first electrical component 103 has a claw structure 104 for matching with the step portion 102.

In some embodiments, during inserting the first electrical component 103 from the first side 101*a* into the first electrical component cavity 105, the claw structure 104 deforms under a squeezing force of the step portion 102. After the first electrical component 103 is inserted into the first electrical component cavity 105, the claw structure 104 restores to contact and lock the step portion 102.

In some embodiments, utilizing the deformation ability of the claw structure 104 itself, during inserting the first electrical component 103 into the first electrical component cavity 105, the claw structure 104 deforms under a squeezing force of the step portion 102, and is contracted towards the side wall of the first electrical component 103. After the first electrical component 103 is inserted into the first electrical component cavity 105, due to its elastic performance, the claw structure 104 restores to its initial state without the action of squeezing force, thereby contacting the step surface of the step portion 102 and locking the step portion 102.

In some embodiments, referring to FIG. 6, there is an inclined angle $\alpha$ between the claw structure 104 and the side wall of the first electrical component 103. The inclined angle $\alpha$ ranges from 6 degrees to 12 degrees.

In some embodiments, in combination with the inherent characteristics of the claw structure 104, when the inclined angle is greater than 12 degrees, a connection force between the claw structure 104 and the side wall of the first electrical component 103 becomes smaller. Thus, when disassembling the first electrical component 103, the force is mostly concentrated on the claw structure 104, thus the insufficient strength of the claw structure 104 is not enough, and the claw structure 104 cannot provide enough strength to smoothly disassemble the first electrical component 103 from the first electrical component cavity 105, and the plastic claw structure may be easily broken during assembly and disassembly. When the inclined angle is less than 6 degrees, due to the small inclined angle, there is insufficient contact between the claw structure 104 and the step portion 102, thus the claw structure 104 cannot grip the step portion 102, which can easily cause falling off of the first electrical component 103.

In some embodiments, the claw structure 104 has an elastic modulus ranging from 0.3 to 0.5. The elastic modulus in this range can ensure that the claw structure 104 has appropriate deformation recovery ability and has appropriate hardness to achieve a rapid disassembly of the first electrical component 103.

In some embodiments, the claw structure 104 is made of a plastic.

Figure 4:
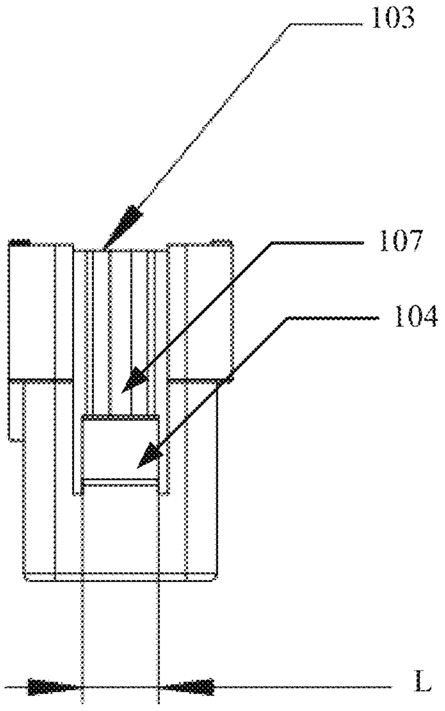
FIG. 4 is a left view of FIG. 3.

In some embodiments, referring to FIG. 4, a guide groove 107 is arranged on the side wall of the first electrical component 103. The guide groove 107 extends to a position between the claw structure 104 and the side wall of the first electrical component 103.

In some embodiments, under the action of the guide groove 107, it is convenient for the first electrical component 103 to be quickly and accurately installed into the first electrical component cavity 105.

In some embodiments, a width L of the claw structure 104 in a direction parallel to the side wall of the first electrical component 103 ranges from 4 mm to 10 mm.

In some embodiments, when the width L of the claw structure 104 in the direction parallel to the side wall of the first electrical component 103 is less than 4 mm, the width of the claw structure 104 is too small, which can easily cause insufficient connection strength between the first electrical component 103 and the first electrical component cavity 105, resulting in slipping between the first electrical component 103 and the first electrical component cavity 105. When the width L of the claw structure 104 in the direction parallel to the side wall of the first electrical component 103 is greater than 12 mm, it is easy to cause a material waste of the claw structure 104, leading to an increase in cost.

In some embodiments, a thickness a of the claw structure 104 ranges from 0.6 mm to 1.2 mm. When the thickness a of the claw structure 104 is less than 0.6 mm, the claw structure 104 is too thin, and cannot provide sufficient strength to lock the step portion 102, causing loosening between the first electrical component 103 and the first electrical component cavity 105. When the thickness a of the claw structure 104 is greater than 1.2 mm, the claw structure 104 is too thick, and there is no enough space between the side wall of the first electrical component 103 and the inner wall of the first electrical component cavity 105 to accommodate the claw structure 104, resulting in an insufficient force on the step portion 102 applied by the claw structure 104, and affecting the effective connection between the first electrical component 103 and the first electrical component cavity 105.

Figure 7:
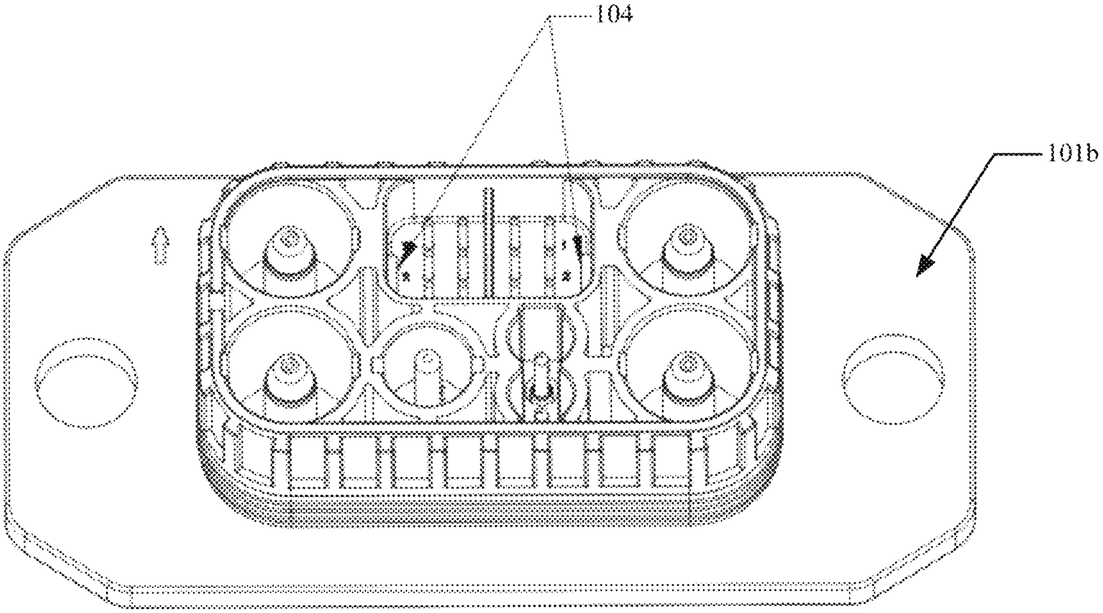
FIG. 7 is a bottom schematic view of a plug connector after assembly according to an embodiment of the present disclosure.

In some embodiments, referring to FIG. 7, the mounting plate 101 also includes a second side 101*b* opposite to the first side 101*a*. The second side 101*b* has a plugging portion corresponding to the electrical component area 106.

In some embodiments, the plugging portion may be connected with an external circuit to achieve an electrical connection of the plug connector 100.

When disassembling the first electrical component 103, a tool is used to counter the claw structure 104 from the second side, causing the claw structure 104 to contract away from the inner wall of the first electrical component cavity 105, thereby withdrawing the first electrical component 103 from the first electrical component cavity 105.

Figure 10:
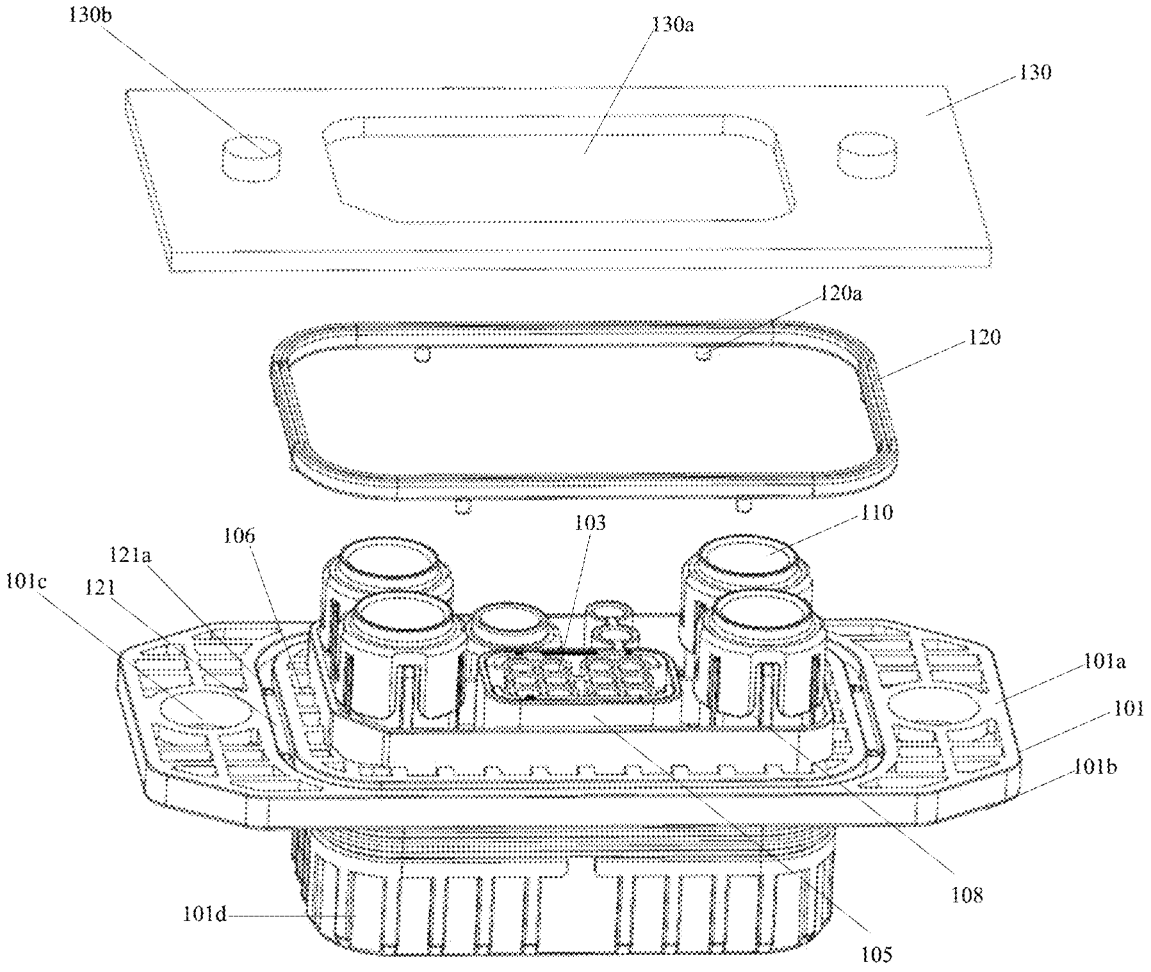
FIG. 10 is an exploded schematic view of a plug connector according to another embodiment of the present disclosure.
Figure 11:
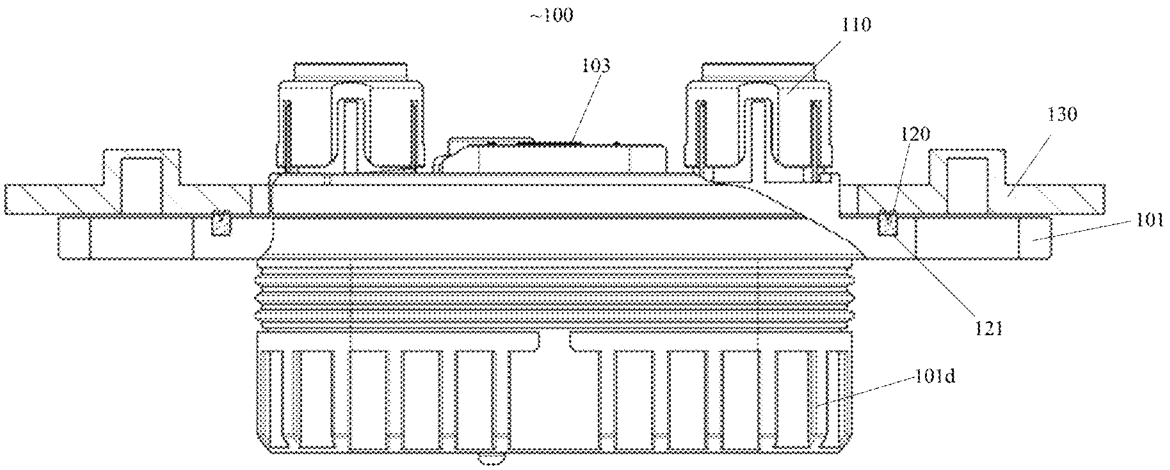
FIG. 11 is a cross-sectional schematic view of a plug connector according to another embodiment of the present disclosure.

FIG. 10 is an exploded schematic view of a plug connector according to another embodiment of the present disclosure, and FIG. 11 is a cross-sectional schematic view of a plug connector according to another embodiment of the present disclosure. The plug connector according to the embodiment as shown in FIGS. 10 and 11 can include any or all of the elements mentioned in the previous embodiments.

Referring to FIGS. 10 and 11, a plug connector 100 includes a mounting plate 101.

The mounting plate 101 includes a first side 101*a*, and the first side 101*a* includes an electrical component area 106.

A first electrical component cavity 105 and a second electrical component cavity 108 are arranged in the electrical component area 106 and extend through the mounting plate 101 from the first side 101*a*.

A first electrical component 103 is arranged in the first electrical component cavity 105, and a second electrical component 110 is arranged in the second electrical component cavity 108.

In some embodiments, the first electrical component 103 is removably connected with the first electrical component cavity 105, and the second electrical component 110 is removably connected with the second electrical component cavity 108.

In some embodiments, the plug connector 100 further includes a groove 121, a sealing ring 120 and a fixing plate 130.

The groove 121 is concave from the first side 101*a* into the mounting plate 101 perpendicular to the first side 101*a*, and the groove 121 surrounds an outer side of the electrical component area 106.

The sealing ring 120 is arranged in the groove 121, and a top surface of the sealing ring 120 protrudes from the first side 101*a*.

The fixing plate 130 is arranged on the first side 101*a*, and the fixing plate 130 has an opening 130*a* for exposing the electrical component area 106. The sealing ring 120 is arranged between the fixing plate 130 and the mounting plate 101.

In some embodiments, the sealing ring 120 is arranged in the groove 121, thus when mounting the fixing plate 130 on the first side 101*a*, the sealing ring 120 can achieve a sealed connection between the fixing plate 130 and the mounting plate 101, which can achieve a good waterproof and antifouling function. In addition, the fixing plate 130 is provided with the opening 130*a* for exposing the electrical component area 106. When the size of the opening 130*a* is not very precise and the fixing plate 130 cannot covers the mounting plate 101, since the top surface of the sealing ring 120 protrudes from the surface of the groove 121 (i.e. the first side 101*a*), the flexibility and elasticity of the sealing ring 120 can make up for the deficiencies caused by the size of the opening 130*a*, which can achieve effective mounting of the fixing plate 130 to the mounting plate 101, improve the quality of the plug connector 100 and improve production efficiency.

In some embodiments, after the sealing ring 120 is installed in the groove 121, the top surface of the sealing ring 120 protrudes from the first side 101*a* by 0.5 mm to 2 mm. When the fixing plate 130 is mounted on the mounting plate 101, an excess part of the sealing ring 120 exists between the fixing plate 130 and the mounting plate 101. Therefore, when the size of the opening 130*a* is larger than that of the electrical component area 106, a gap between the opening 130*a* and the electrical component area 106 can be filled with the excess part of the sealing ring 120 to ensure the sealing between the fixing plate 130 and the mounting plate 101, which can achieve effective mounting of the fixing plate 130 to the mounting plate 101 and reduce the processing difficulty and requirements of the fixing plate 130.

In some embodiments, a ratio of a volume of a part of the sealing ring 120 protruding from the first side 101*a* to a volume of the sealing ring 120 ranges from 0.2:1 to 0.3:1, which can achieve a best compression waterproof sealing effect when the fixing plate 130 is mounted on the mounting plate 101, and a compressed volume of the part of the sealing ring 120 is 20-30% of its original volume.

In some embodiments, a Shore hardness of the sealing ring 120 ranges from 30 HA to 50 HA, and an elastic coefficient of the sealing ring 120 ranges from 0.01 N/m to 0.5 N/m.

In some embodiments, selecting a reasonable range of Shore hardness and elastic coefficient can not only ensure that the sealing ring 120 can be compressed and provide good sealing effect, but also allow for corresponding floating during the installation process, which can achieve effective installation between the fixing plate 130 and the mounting plate 101, and thus have broad practical significance.

In some embodiments, the sealing ring 120 may be made of a mixture of a silicone and a phenyl silicone oil, and a mass ratio of the phenyl silicone oil to the silicone ranges from 0.01:1 to 0.03:1. The silicone contains 1%-3% phenyl silicone oil, which can increase a fluidity of the material. If the content of the phenyl silicone oil is too low, the fluidity of the material will be poor and the floating effect will not be good; and if the content of the phenyl silicone oil is too high, the overall material is soft and the sealing effect is not good.

In some embodiments, a depth of the groove 121 ranges 2 mm to 4 mm, and a width of the groove 121 ranges from 2 mm to 4 mm. When the depth or width of the groove 121 is too large, the volume of the sealing ring 120 is too large, which can increase costs. Moreover, if the sealing ring 120 is too large, a strength between the fixing plate 130 and the mounting plate 101 can be decreased, which cannot ensure the performance of the plug connector 100.

In some embodiments, there are one first electrical component cavity 105 and four second electrical component cavities 108 surrounding the first electrical component cavity 105, and the four second electrical component cavities 108 are symmetrically distributed in pairs on the electrical component area 106. That is, the first electrical component cavity 105 is arranged between adjacent second electrical component cavities 108.

In some embodiments, a pattern of the electrical component area 106 projected onto the first side 101*a* has a quasi-rectangular shape, and the four second electrical component cavities 108 are arranged at four top corners of the quasi-rectangular shape.

In some embodiments, the pattern of the electrical component area 106 projected onto the first side 101*a* can also have other shapes, which can be set according to actual needs.

In some embodiments, the number and position of the first electrical component cavity and the second electrical component cavity can also be set according to actual electrical needs.

In some embodiments, the first electrical component 103 and the second electrical components 110 can have different functions. By combining the first electrical component 103 and the second electrical components 110 on the plug connector 100, a hybrid energy storage conductive transmission connection can be achieved, which is convenient for coordination and connection between a plurality of connectors.

Still referring to FIGS. 10 and 11, the mounting plate 101 has a mounting hole 101*c*, and the fixing plate 130 has a fixing hole 130*b* corresponding to the mounting hole 101*c*. When the fixing plate 130 is placed on the mounting plate 101, the fixing hole 130*b* coincides with the mounting hole 101*c*.

When the fixing plate 130 is placed on the mounting plate 101 and the fixing hole 130*b* coincides with the mounting hole 101*c*, a fixing member (not shown in the figure) may be used to fix the mounting plate 101 and the fixing plate 130.

In some embodiments, the fixing member may be a screw, and the fixing hole 130*b* and the mounting hole 101*c* may be respectively provided with threads corresponding to the screw.

In some embodiments, the fixing member may also be a pin, rivet, or the like.

Still referring to FIG. 10, the groove 121 further includes a plurality of positioning holes 121*a*, and the plurality of positioning holes 121*a* are evenly arranged at a bottom of the groove 121.

In some embodiments, a pattern of the groove 121 projected onto the first side 101*a* has a quasi-rectangular shape, and the plurality of positioning holes 121*a* are symmetrically distributed on a pair of bottom surfaces of the groove 121.

In some embodiments, there are four positioning holes 121*a*. Two bottoms of the groove 121 each have two positioning holes 121*a*.

In other embodiments, the number of the positioning holes 121*a* can be set according to actual needs.

Still referring to FIG. 10, the sealing ring 120 further includes a plurality of fixing posts 120*a* corresponding to the plurality of positioning holes 121*a*. When the sealing ring 120 is positioned in the groove 121, each of the plurality of fixing posts 120*a* is inserted in one corresponding positioning hole 121*a*.

In some embodiments, an outer diameter of the fixing posts 120*a* is slightly larger than an inner diameter of the positioning holes 121*a*.

In some embodiments, when the sealing ring 120 is positioned in the groove 121, each fixing post 120*a* is inserted in each positioning hole 121*a* correspondingly. With the fixing post 120*a* inserted in the positioning hole 121*a*, when the sealing ring 120 floats or shifts, and the fixing post 120*a* trends to detach from the positioning hole 121*a*, a reaction force will be generated between the fixing post 120*a* and the positioning hole 121*a* to prevent the fixing post 120*a* from detaching from the positioning hole 121*a*, which can ensure that the sealing ring 120 can be always positioned in the groove 121 and ensure the sealing between the fixing plate 130 and the mounting plate 101.

In some embodiments, the plurality of fixing posts 120*a* may be integrally formed with the sealing ring 120.

In other embodiments, the plurality of fixing posts 120*a* may be not integrally formed with the sealing ring 120.

Still referring to FIGS. 10 and 11, the mounting plate 101 also includes a second side 101*b* opposite to the first side 101*a*. The second side 101*b* is provided with a plugging portion 101*d* corresponding to the electrical component area 106.

In some embodiments, the plugging portion 101*d* may be connected with an external circuit to achieve an electrical connection of the plug connector 100.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. A plug connector, comprising:

a mounting plate comprising a first side, wherein the first side comprises an electrical component area;

a first electrical component cavity and a second electrical component cavity arranged in the electrical component area and extending through the mounting plate from the first side; and a first electrical component arranged in the first electrical component cavity and a second electrical component arranged in the second electrical component cavity;

wherein the plug connector further comprises:

a groove concave from the first side into the mounting plate perpendicular to the first side, wherein the groove surrounds an outer side of the electrical component area;

a sealing ring arranged in the groove, wherein a top surface of the sealing ring protrudes from the first side; and a fixing plate arranged on the first side, wherein the fixing plate has an opening for exposing the electrical component area, and the sealing ring is arranged between the fixing plate and the mounting plate.

2. The plug connector of claim 1, wherein the first electrical component is removably connected with the first electrical component cavity, and/or the second electrical component is removably connected with the second electrical component cavity.

3. The plug connector of claim 2, wherein the first electrical component cavity is provided with at least one step portion protruding from an inner wall of the first electrical component cavity.

4. The plug connector of claim 3, wherein a side wall of the first electrical component is provided with a claw structure for matching with the step portion, when the first electrical component is inserted into the first electrical component cavity from the first side, the claw structure deforms under a squeezing force of the step portion, and after the first electrical component is inserted into the first electrical component cavity, the claw structure restores to contact and lock the step portion.

5. The plug connector of claim 4, wherein an inclined angle between the claw structure and the side wall of the first electrical component ranges from 6 degrees to 12 degrees, and the claw structure has an elastic modulus ranging from 0.3 to 0.5.

6. The plug connector of claim 1, wherein the first electrical component is configured to transmit a communication signal or a control signal, and the second electrical component is configured to transmit a power signal.

7. The plug connector of claim 1, wherein the second electrical component cavity is provided with a pair of positioning posts symmetrically arranged on an outer wall of the second electrical component cavity.

8. The plug connector of claim 7, wherein the second electrical component cavity is further provided with a plurality of first guide posts and a plurality of second guide posts arranged on the outer wall of the second electrical component cavity, and the plurality of first guide posts and the plurality of second guide posts are respectively arranged on the outer wall of the second electrical component cavity between the pair of positioning posts.

9. The plug connector of claim 8, wherein a plurality of inverted buckles are arranged on the outer wall of the second electrical component cavity, wherein at least one inverted buckle is arranged between adjacent first guide posts, and at least one inverted buckle is arranged between adjacent second guide posts.

10. The plug connector of claim 9, wherein the second electrical component comprises a wire and a back cover sleeved on a portion of an outer wall of the wire, and a side wall of the back cover has an inverted buckle step corresponding to the inverted buckle.

11. The plug connector of claim 10, wherein the side wall of the back cover also has a plurality of first guide post slots corresponding to the plurality of first guide posts respectively and a plurality of second guide post slots corresponding to the plurality of second guide posts respectively, when the second electrical component is inserted into the second electrical component cavity from the first side, the inverted buckle deforms under a squeezing force of the inverted buckle step, and after the second electrical component is inserted into the second electrical component cavity, the inverted buckle restores to contact and lock the inverted buckle step, the plurality of first guide posts are inserted into the plurality of first guide post slots respectively, and the plurality of second guide posts are inserted into the plurality of second guide post slots respectively.

12. The plug connector of claim 11, wherein a first gap is formed between each of the plurality of first guide posts and each of the plurality of first guide post slots, a second gap is formed between each of the plurality of second guide posts and each of the plurality of second guide post slots, and a size of the first gap is different from a size of the second gap.

13. The plug connector of claim 1, wherein the groove further comprises a plurality of positioning holes evenly arranged at a bottom of the groove, the sealing ring further comprises a plurality of fixing posts corresponding to the plurality of positioning holes, and when the sealing ring is positioned in the groove, the plurality of fixing posts are inserted in the plurality of positioning holes respectively.

14. The plug connector of claim 1, wherein the sealing ring has a Shore hardness ranging from 30 HA to 50 HA and an elastic coefficient ranging from 0.01 N/m to 0.5 N/m; and/or wherein the sealing ring is made of a mixture of a silicone and a phenyl silicone oil, and a mass ratio of the phenyl silicone oil to the silicone ranges from 0.01:1 to 0.03:1.

15. The plug connector of claim 1, wherein the top surface of the sealing ring protrudes from the first side by 0.5 mm to 2 mm, and/or wherein a ratio of a volume of a part of the sealing ring protruding from the first side to a volume of the sealing ring ranges from 0.2:1 to 0.3:1.

* * * * *